US008657373B2

(12) United States Patent
Miles

(10) Patent No.: US 8,657,373 B2
(45) Date of Patent: Feb. 25, 2014

(54) VEHICLE TRANSFER SLING

(76) Inventor: Katherine Miles, Baltimore, MD (US)

(*) Notice: Subject to any disclaimer, the term of this patent is extended or adjusted under 35 U.S.C. 154(b) by 666 days.

(21) Appl. No.: 12/941,688

(22) Filed: Nov. 8, 2010

(65) Prior Publication Data
US 2011/0278888 A1 Nov. 17, 2011

Related U.S. Application Data

(60) Provisional application No. 61/280,637, filed on Nov. 6, 2009.

(51) Int. Cl.
A61G 7/053 (2006.01)
A47C 31/10 (2006.01)

(52) U.S. Cl.
USPC .................. 297/229; 297/228.1; 5/81.1 R

(58) Field of Classification Search
USPC ............. 297/228.1–228.13, 229; 5/81.1 R, 5/81.1 T, 89.1
See application file for complete search history.

(56) References Cited

U.S. PATENT DOCUMENTS

| 3,829,914 | A | * | 8/1974 | Treat .............................. 5/81.1 T |
| 4,723,327 | A | | 2/1988 | Smith |
| 4,944,057 | A | | 7/1990 | Shaw |
| 5,297,834 | A | | 3/1994 | Vanamem |
| 5,442,821 | A | | 8/1995 | Weeks |
| 5,465,441 | A | * | 11/1995 | Chun ................................. 5/653 |
| 6,276,006 | B1 | * | 8/2001 | Hoit .............................. 5/81.1 R |
| 6,578,210 | B2 | | 6/2003 | Erickson |
| 6,671,899 | B1 | | 1/2004 | Oja |
| 6,715,167 | B2 | | 4/2004 | Wake |
| 7,258,399 | B2 | * | 8/2007 | Neustat ....................... 297/219.1 |
| 2004/0025250 | A1 | * | 2/2004 | Bezalel ......................... 5/81.1 R |
| 2006/0150322 | A1 | * | 7/2006 | Schrepfer ..................... 5/81.1 T |
| 2007/0176474 | A1 | * | 8/2007 | Miller et al. .................. 297/224 |
| 2008/0001451 | A1 | * | 1/2008 | Olson ....................... 297/219.12 |

* cited by examiner

Primary Examiner — Sarah B McPartlin
(74) Attorney, Agent, or Firm — Ober, Kaler, Grimes & Shriver; Royal W. Craig

(57) ABSTRACT

A transfer sling having a generally rectangular fabric element sized to cover bottom of an automobile seat and to extend at least part way up the seat back ending in a yoke to be attached to a vehicle headrest at the top of the seat back. The lower portion of the fabric element is further constructed of an additional, second ply of low friction fabric material sewn together with the fabric element marginally at only the juncture with the top portion so that the two fabric plies remain free to slide relative to one another with minimal resistance thereby enabling the seated individual to more easily rotate their legs to/from a forward oriented position from/to a side oriented position in relation to the vehicle. An adjustable strap with a releasable buckle is provided approximately at the transition point between the upper and lower portions of the fabric element for reinforcing the two-ply joint and for engaging the seat back and retaining the lower portion of the fabric element in relative proximity to the seat bottom of the vehicle seat.

11 Claims, 4 Drawing Sheets

VEHICLE TRANSFER SLING

CROSS REFERENCE TO RELATED APPLICATIONS

The present application derives priority from provisional application 61/280,637 filed on Nov. 6, 2009 which is incorporated herein by reference.

BACKGROUND OF THE INVENTION

1. Field of the Invention

The present invention relates to devices for facilitating vehicle transportation of persons with limited mobility, such as the elderly or disabled, and more particularly to a sling for facilitating entry or exit of such persons to or from a vehicle.

2. Description of the Background

Population aging is the shift in the distribution of a country's population toward older ages and is generally a result of declining birthrates in the developed world coupled with increased total life spans. Population aging is occurring in most of the world, but is most advanced in the richest countries. Worldwide, the median age of the population rose from 23.9 in 1950 to 26.8 in 2000, and is forecast to rise to 37.8 by 2050. Among the countries currently classified by the United Nations as more developed, the corresponding figures rose from 29.0 in 1950 to 37.3 in 2000, and is forecast to rise to 45.5 by 2050. In the United States the median age in 2010 is 35.3 years and is expected to increase to 39.0 years by 2050.

The U.S. median age increase is held down as compared to the world due to increases in relatively young population constituents from net international migration into the country. Nevertheless, the percentage of American over the age of 65 is projected by the U.S. Census Bureau to increase from 12 percent of the total population in 2004 to 21 percent in 2050. This will represent a 147 percent increase in the number of individuals over the age of 65 from 36.3 million in 2004 to 86.7 million in 2050 (as compared to a projected increase of 49% of the population as a whole over the same period.)

According to the U.S. Census Bureau, of the U.S. population 65 and older, 28.6 percent report having a physical disability that is a "long lasting, substantial limitation on one or more basic physical activities, such as walking, climbing stairs, reaching, lifting, or carrying." That figure increases to 32.7 percent for individuals between the ages of 75 and 84 and again to 53.1 percent for those over 85. Similarly, 20.4 percent of individuals over the age of 65 report difficulty "going outside the home alone to shop or visit a doctor's office," a number which increases to 23.6 percent for individuals 75 to 84 and jumps to 47.3 percent for those 85 and over.

Although not all difficulties leaving the home are the result of physical infirmity, many elderly individuals rely on professional and family caregivers for transportation to daily activities and engagements. Other persons of limited mobility such as paraplegics, quadriplegics, and those suffering from diseases or conditions such as muscular dystrophy and cerebral palsy similarly rely on caregivers for their transportation needs regardless of their age. In the developed world, cars are quite obviously among the most common modes of such transport and the task of entering and exiting a car, while seemingly simple for the able bodied, can be a difficult task for those with physical disabilities, even with the aid of their caregiver. Exiting a car requires an elderly/disabled person to swing their legs forty-five to ninety degrees from center so as to face the door opening and then simultaneously shift their weight forward over their feet and lift themselves to a standing position. Given the confined conditions of modern vehicle interiors, a caregiver can, at best, offer a handhold to aid the individual in pulling themselves up and out of the seated position and, at worst, can injure themselves or the patient when trying to help. A device to permit the caregiver to aid in the transfer between the standing and seated positions would be desirable.

A variety of transfer devices are known for transporting persons from one location to another currently exist for other situations, such as lifting from a hospital bed. For example, U.S. Pat. No. 4,723,327 to Smith issued Feb. 9, 1988 discloses a device to transport and move bed ridden patients easily and securely without potential injury to either the patient or the attendant. The device comprises a generally square sheet of flexible fabric material with an integral perimeter handle movable positioned within the fabric. Others include U.S. Pat. No. 4,944,057 to Shaw issued Jul. 31, 1990 which discloses a device to assist in lifting and supporting a handicapped or infirm person from a sitting position on a supporting surface, and transferring the person to a sitting position on a second supporting surface. The device includes a main body portion of fabric or other flexible material having a configuration tending to conform naturally to the body contours of a person seated thereon. U.S. Pat. No. 5,297,834 to Vanarnem issued Mar. 29, 1994 discloses a method and apparatus for lifting and transferring a disabled person to and from a wheel chair including an elongated sheet of material having handles at each end. The sheet of material is spread beneath the buttocks of a seated disabled person. An attendant reaches for the handles to either side of the person and straightens up to lift the person slightly from the place at which the person is seated.

Similarly, U.S. Pat. No. 5,442,821 to Weeks issued Aug. 22, 1995 discloses a sling for transferring a patient including a trough of strong flexible sheet material having a bottom, opposite side walls and opposite end walls. The side walls are connected to the end walls at four corners with a reinforced edge extending along the side walls, end walls and around the four corners. A pair of flexible handle straps are connected to each of the side walls. U.S. Pat. No. 6,276,006 to Hoit issued Aug. 1, 2001 discloses a An apparatus and method for moving an airline passenger whereby a Tyvek® sling having handles attached thereto is buckled about an airline passenger and the passenger is lifted and transferred, by two or more persons grasping the handles, from a wheelchair on the aircraft into an adjacent seat.

U.S. Pat. No. 6,578,210 to Erickson issued Jun. 17, 2003 discloses a support assembly for use with a patient lift system. U.S. Pat. No. 6,671,899 to Oja issued Jan. 6, 2004 discloses a lifting device made of a single piece of a flexible material, substantially forming a loop. U.S. patent application Ser. No. 10/636,694 by Bezalel filed Aug. 8, 2003 discloses a transfer assembly for use by caregivers to lift, support or move an elderly or infirm patient without lower back strain to the caregiver is significantly reduced. U.S. Pat. No. 6,715,167 to Wake issued Apr. 6, 2004 discloses a device designed to assist in the lifting and transfer of patients by a torso belt with hold and support handles on back, secured by sewn on hook and loop style fasteners. U.S. patent application Ser. No. 11/328,369 by Schrepfer filed Jan. 9, 2006 discloses a patient transfer sheet comprising a nylon sheet for transferring a patient and having a first pair of loop handles and a second pair of loop handles for supplying and carrying the patient.

Notably, none of the foregoing references suggests their use in specific conjunction with lateral entry/exit to or from a car or from a seated to a standing position. Indeed, the foregoing devices are either heavy and complex mechanical lifts or slings or are not well suited for use in a vehicle. What is needed is a transfer sling design specifically to permit a caregiver in assist in extracting an elderly or disabled person from a car seat, that is lightweight for in-car storage and can be used by unskilled operators.

It is, therefore, an object of the present innovation to provide a vehicle sling to enable a caregiver to assist an elderly or disabled person to a standing position from a seated position (or vice-versa) in a vehicle such as a car.

It is another object of the present invention assist a caregiver or the patients themselves in swinging their legs forty-five to ninety degrees from center toward a door opening and then shifting their weight to a standing position over their feet.

It is another object to provide a vehicle sling as above that facilitates rotation of the patient by a low friction fabric-on-fabric interface and yet which does not facilitate forward sliding of the patient in an emergency vehicle stop maneuver.

It is another object to provide a vehicle sling as above that is lightweight for in-car storage and can be used by unskilled operators.

SUMMARY OF THE INVENTION

The present invention provides a transfer sling in the form of a generally rectangular fabric element sized to cover the (horizontal) seat bottom of an automobile seat and to extend at least part way up the (vertical) seat back. A yoke at the top of the rectangular element allows the sling to be attached to a vehicle headrest at the top of the seat back and hung there from. At least the lower portion of the fabric element is further constructed of an additional, second ply of low friction fabric material (e.g., ripstop Nylon) sewn together with the fabric element marginally only at the juncture with the top (yoke) portion so that the two fabric plies remain free to slide relative to one another with minimal resistance thereby enabling the seated individual to more easily rotate their legs to/from a forward oriented position from/to a side oriented position in relation to the vehicle. A strap of adjustable length with a releasable buckle is provided on the upper ply of the seated portion at or just below the transition point between the upper and lower portions of the fabric element for engaging the seat back and retaining the lower portion of the fabric element in relative proximity to the seat bottom of the vehicle seat.

In operation, the disabled or infirm patient is seated in the vehicle with the lower portion of the fabric element between their person and the seat bottom. The patient him/herself or an able-bodied caregiver standing in the open door of a vehicle is aided in rotating the patients legs into and through the door opening with their feet on or near the outside ground surface by the low friction relative movement of the upper fabric ply relative to the lower fabric ply. The patient, with or without the aid of a caregiver, can then shift their weight forward and lift or pull themselves up and over their feet to be supported by their legs.

DESCRIPTION OF THE DRAWINGS

The objects, features, and advantages of the present invention will become apparent from the following detailed description of the preferred embodiments and certain modifications thereof when taken together with the accompanying drawings in which like numbers represent like items throughout and in which.

DETAILED DESCRIPTION OF THE PREFERRED EMBODIMENT

The present invention provides a vehicle transfer sling specifically to aid a patient (or permit a caregiver to aid a patient) from a vehicle by facilitating rotation of the patient's legs toward a door opening via a low friction fabric-on-fabric interface, and then moving the patient to a standing position by shifting their weight forward onto their feet. The vehicle transfer sling is a generally rectangular fabric element sized to substantially cover a vehicle seat, and which is draped thereon before the patient gets inside the vehicle. As described below, the transfer sling is constructed to provide a low friction interface between the patient and the vehicle seat, and facilitates rotation of the seated individual. Once rotated into the door facing position, the patient can be assisted in standing up and exiting the vehicle. When not in use the sling folds into itself for compact storage.

Figure 1:
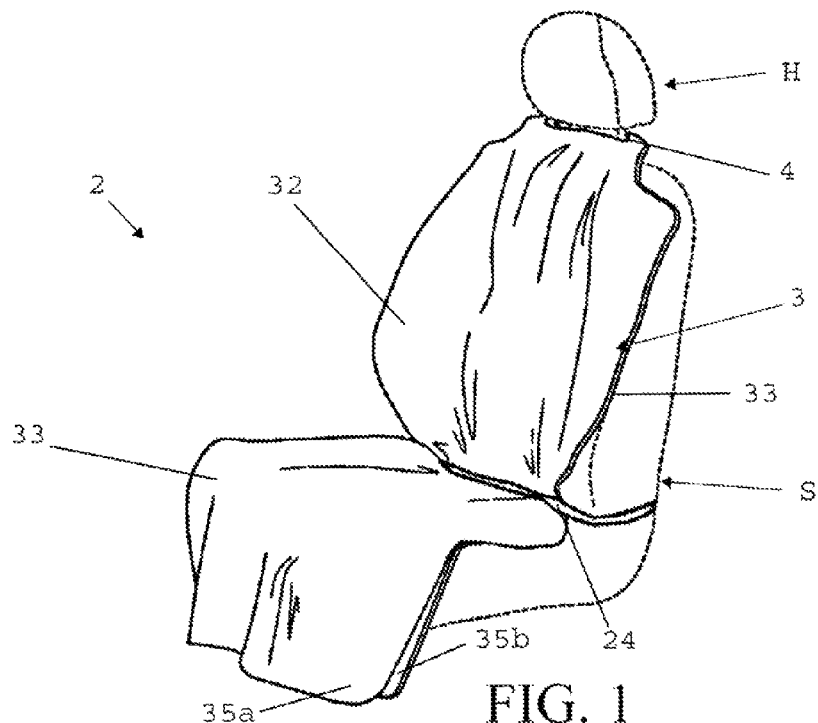
FIG. 1 is a perspective view of a sling according to the present invention applied to a vehicle bucket seat.

With reference to FIG. 1, a transfer sling 2 is provided in the form of a generally rectangular low-coefficient-of friction fabric panel 3 having a top end 31, a two-ply bottom end 32 and reinforcing side margins 33 sewn long the entire periphery of both top and bottom ends. The top end 31 may or may not be two ply but is sewn together at the periphery where construction is two ply to form a single element. The two plys of the lower bottom end are not joined at their periphery save for where they meet at the upper end 31/lower end transition, which is defined by such meeting. A separable/detachable yoke 4 is provided in the top end of the panel 3 for engaging a headrest H or similar element positioned at the top of the back of a vehicle's seat S.

With continued reference to FIG. 1, the top end 31 may be constructed of a single ply fabric material or be of a two-ply construction as described with respect to the bottom end 32. The two-ply bottom end 32 of fabric panel 3 is constructed of two layers 35a, 35b of like low-friction material. The layers 35a, 35b are of a woven or non-woven construction and are preferably of a natural or synthetic material having a low coefficient of sliding friction such as ripstop Nylon™ or like material having a coefficient of friction within a range of approximately 0.1-0.25 relative to like material. Other suitable materials include fabrics made from polytetrafluoroethylene (PTFE), polyester and polypropylene as well as coated fiber fabrics as with, for example, silicone coated fibers. For purposes of clarity in this application alone, and with reference to FIG. 1, the layer 35b adjacent to the vehicle seat will be referred to herein as the bottom layer or lower layer of fabric and the layer 35a adjacent to the occupant of the seat will be referred to as the top or upper layer of fabric. It should be noted that in certain embodiments, the layers 35a, 35b are interchangeable such that the sling 2 can be installed in a vehicle with either layer acting as the upper or lower layer at a given time.

A medial cotton strap 24 of approximately 5.5' length is sewn horizontally across the entire fabric panel 3 between and beyond the side margins 33, preferably using an unbroken double seam to prevent tearage. The medial strap 24 preferably extends approximately 1.25' on either side terminating at hardware elements 25 (such as mating detent buckles) for securement around the back of the vehicle seat. The medial strap 24 is provided at or just below (approximately 2") the transition line from the top end 31 of the panel to a bottom end 32 and generally bisects the panel 3 into or nearly into the two portions. Where the medial strap is positioned at the transition line it is stitched through both the upper and lower layers 35a, 35b and the entire sling 2 will be interchangeable with respect to the upper and lower layers 35a, 35b as noted. Where the medial strap 24 is positioned just below the transition, it is only stitched through the upper layer 35a and the sling 2 must be positioned on the seat with the upper layer 35a to which the strap is stitched adjacent to the passenger. It should be noted that the term "bisected" as used herein does not require that the two areas be of precisely equal size and in fact it is preferred that the lower portion 32 be generally shorter in length than the upper portion 31 as a vehicle seat bottom is typically shorter than a seat back.

The sling 2 attaches to most any vehicle bucket seat by virtue of the yoke 4 about the headrest in combination with the medial strap 24 about the seat at the base of the seat back portion, and this two-stage attachment effectively suspends the two-ply bottom end 32 of fabric panel 3 on the horizontal seat. The lateral strap is provided with a hardware element 25 so as to be adjustable in length and to permit joining the ends of the lateral strap 24 so as to from a continuous loop. The hardware element 25 is preferably a side releasable plastic buckle but may be of other suitable hardware design such as a cam buckle, double D-rings, three-bar slide, strap adjusters or the like.

The lower portion 32 of the panel 3 extends from approximately the lateral strap 24 (or more accurately the transition line from the top end 31 of the panel to a bottom end 32) to the bottom of the bottom end 32 and may, in certain embodiments such as that pictured in FIG. 1, be slightly wider, side to side, than the upper portion of the panel 3 to as to provide better coverage of the seat bottom, although this is not necessarily so. The upper layer 35a and lower layer 35b are not joined at their side and bottom periphery, but rather remain completely independent of and free to move relative to one another. In certain alternate embodiments, optional handholds or straps may be provided at the periphery of the panel 3 along the upper and/or lower portions 31, 32.

In general use, the fabric panel is positioned on the seat with the yoke 4 encircling the headrest H as shown and thereby secured to the seat S. The upper portion 31 of the panel drapes down the seat upright and terminates at the seat back-seat bottom juncture. The length of the upper portion 31 need not match that of the seat back exactly as any extra fabric may be tucked into the void between the seat back and bottom. The two-ply bottom portion 32 of the panel is laid flat on the seat bottom. The lateral strap 24 is extended behind the seat back where the ends are left disconnected. Alternately, the ends may be bucked or otherwise joined at the hardware element 25 with the length of the strap left sufficiently long so as not to impede movement of the fabric panel 3 and particularly of the lower portion. The upper and lower layers 35a, 35b of the bottom portion of the panel 3 are draped over and remain in position on the seat bottom itself. An elderly passenger will sit atop the transfer sling 2 as shown.

The sling 2 can be used to seat the passenger (P) with the aid of a caregiver (C) by draping the upper layer 35a of the panel 3 over the side edge of the seat. The individual, again with the aid of a caregiver, rotates forward approximately 45 degrees and positions his/her feet in the vehicle. Relative motion between the low friction surfaces of the upper and lower layers 35a, 35b work to reduce the amount of effort (force) needed to effectuate this initial rotation. If needed, the caregiver may then enter the opposite side of the vehicle and pull on the top layer 35a to both complete the rotation of the individual into a forward facing orientation and slide the person laterally (i.e. translate) into position on the seat bottom. Once the passenger is facing forward, the caregiver can grab hold of the upper portion 31 near the transition line and give a tug in order to slide the passenger back into the seat. The passenger may assist by pushing with their legs if they are able. The caregiver then goes to the backseat of the vehicle and buckles the strap 24 (if not already buckled) and cinches it tight around the seatback to prevent further, unwanted low friction sliding. It should be observed that the lateral strap 24 is positioned at the bottom of the seat back generally along an extension of the plane of the seat bottom and prevents the bottom portion of the panel from sliding forward relative to the vehicle seat during operation of the vehicle. The low friction surfaces of the upper and lower layers 35a, 35b again work to reduce the amount of effort needed to effectuate the final rotation and translation of the individual.

Passenger exit from the vehicle is accomplished by generally reversing the steps of entering the vehicle as described. The hardware element 25 is unbuckled releasing the lateral strap loop and the individual, with the aid of a caregiver as necessary, rotates their feet and lower body approximately 45 degrees toward the door opening from the forward facing center orientation and translates laterally toward the edge of the seat closest to the door opening. A caregiver may grasp the edge of the upper layer 35a to assist with translation and rotation while the low friction interaction between the upper layer 35a and lower layer 35b reduces the effort needed to complete the movement. Once on the edge of the seat, rotation is completed in the same manner such that the feet are on or near the ground surface outside the vehicle. The individual then, again with or without help from a caregiver, shifts their weight forward and lifts themselves (or is lifted) over their feet.

Figure 2:
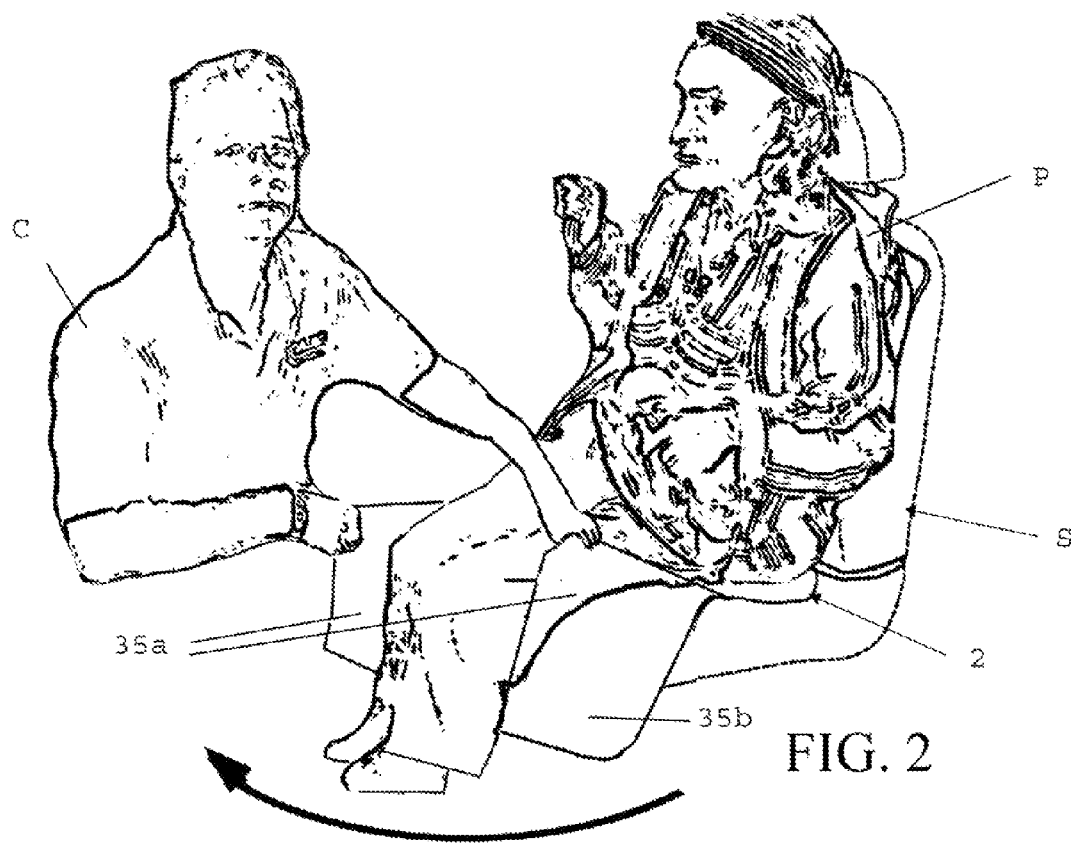
FIG. 2 is a perspective view of a sling as in FIG. 1 with a seated elderly passenger and assisting caregiver illustrating its use.
Figure 3:
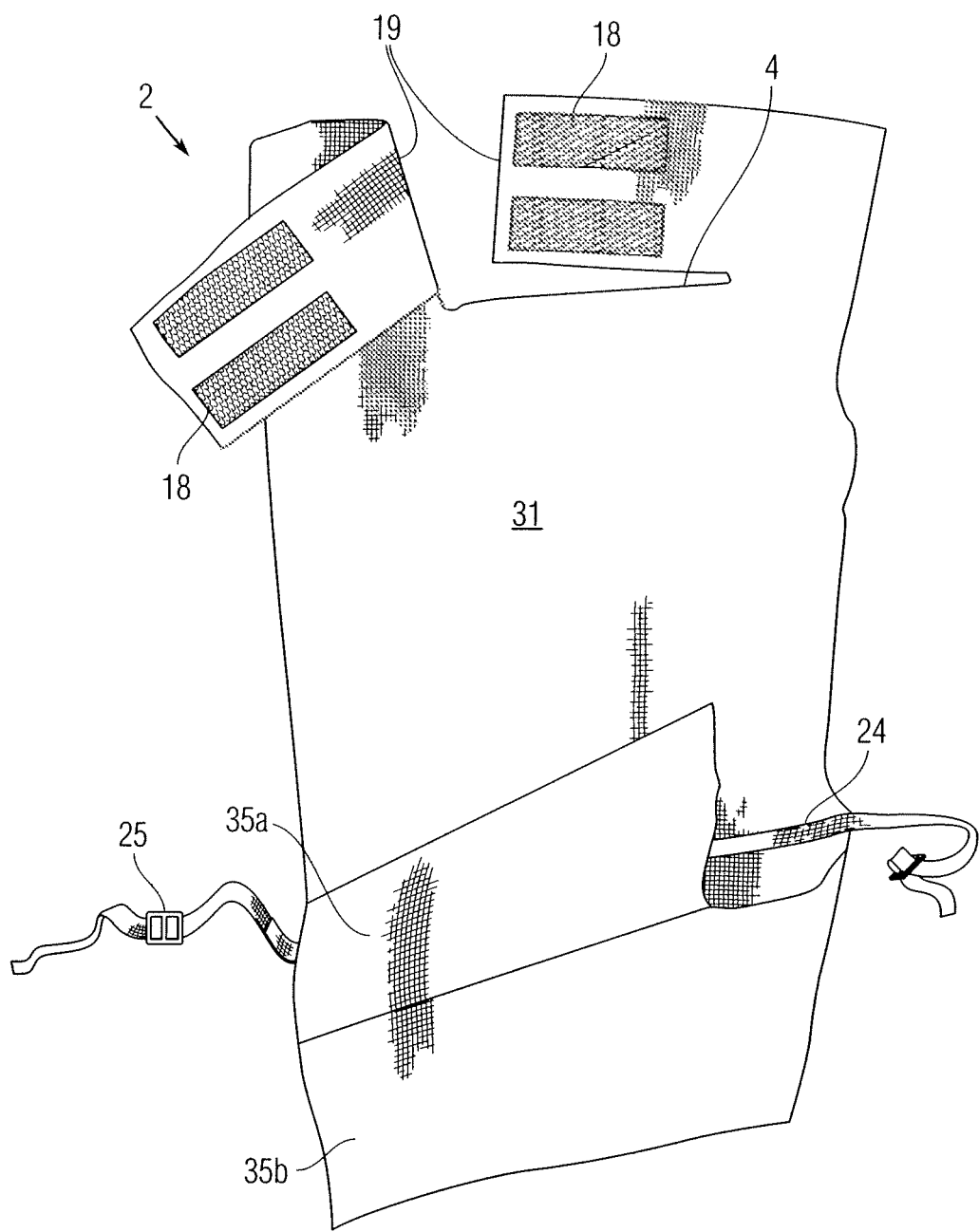
FIG. 3 is a perspective view of a sling according to an embodiment of the invention laid out on a flat surface.

As seen in FIG. 3, owing to the variety of vehicle headrest designs and sizes, the yoke 4 is provided with a hook-and-loop split junction 19 to facilitate insertion of the headrest H into the yoke 4 as depicted in FIGS. 1 and 2. The split junction 19 is preferably closed and secured by dual-parallel strips of opposing hook and loop fasteners 18 as depicted which may be adjusted to loop around and engage the headrest H.

Figure 4:
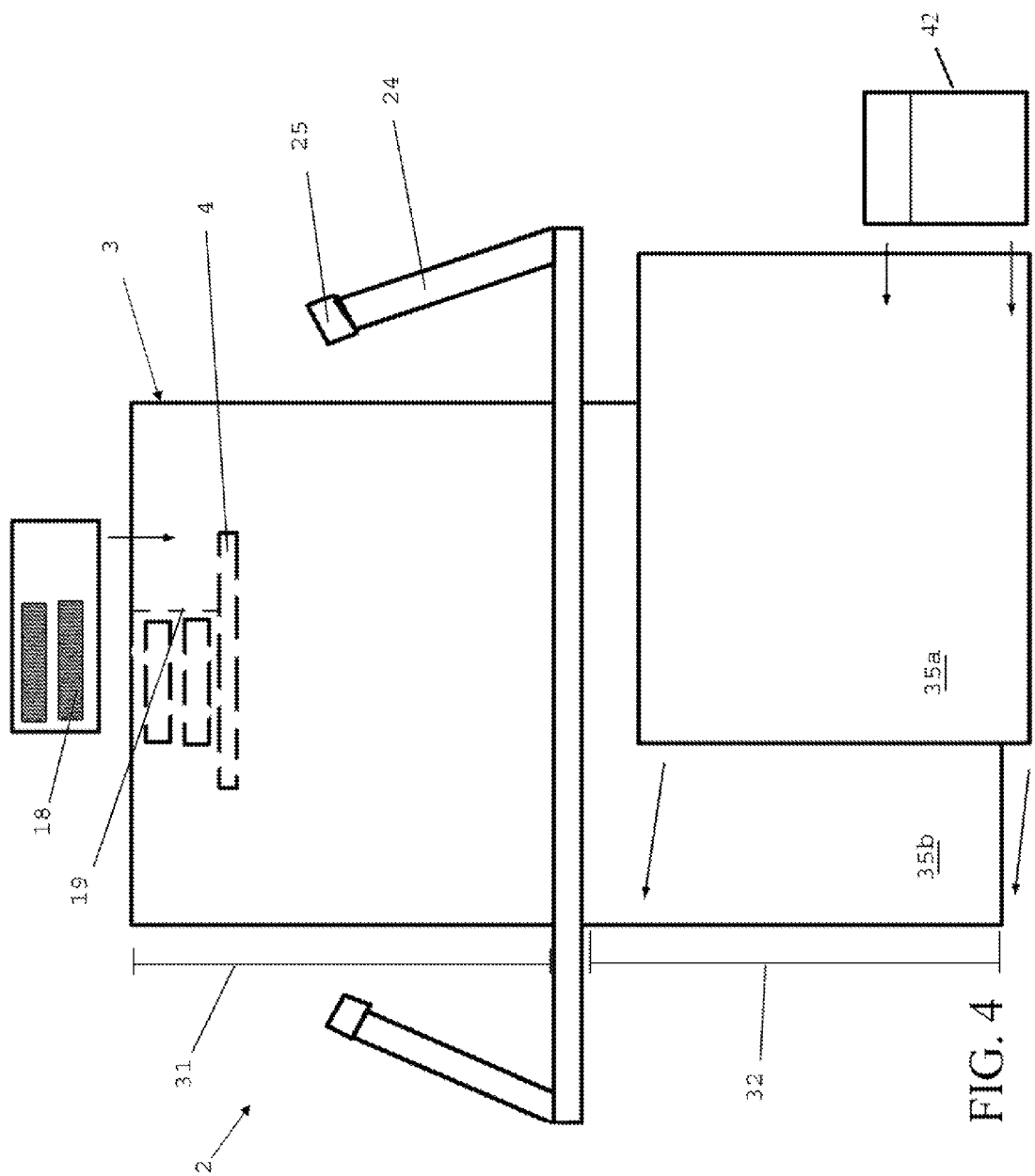
FIG. 4 is a top view of a sling according to an embodiment of the invention illustrating its assembly pattern.

As seen in FIG. 4, the top end 31 of the fabric panel 3 and lower layer 35b of the bottom end 32 are preferably cut as a unitary rectangular section, and a smaller rectangle forming the upper layer 35a of the panel 3 is joined along its upper edge midway along the fabric panel 3 between the top end 31 and lower layer 35b of the bottom end 32. The panel 3 periphery is reinforced by a fabric margin folded around the edges and stitched thereto. In an alternate method of construction, the fabric panel is cut from a unitary rectangular section of fabric that is twice the size of the finished sheet and folded over, preferably at the yoke end, to form a single, two ply sheet of the proper size. The two-plys of the top end 31 are then stitched about their periphery to form a single panel whereas the ply's of the bottom end 32 are joined only where they meet the top portion 31.

The yoke 4 is formed by cutting a 1"×12" rectangular slit into the upper portion 31 approximately 6" beneath the top edge, cutting along a vertical line offset 6" from center from the top edge to the slit, and then sewing a rectangular extension to the right (or left) of the offset vertical cut, and extending to the left (or right) so as to form overlapping extensions. Alternately, both sides may be extended to form the overlap. Dual-parallel strips of opposing hook and loop fasteners 18 are sewn to the inwardly facing side of the extension and likewise to the outwardly facing side to the left to form the split junction 19, which may be adjusted to loop around and engage the headrest H.

Figure 5:
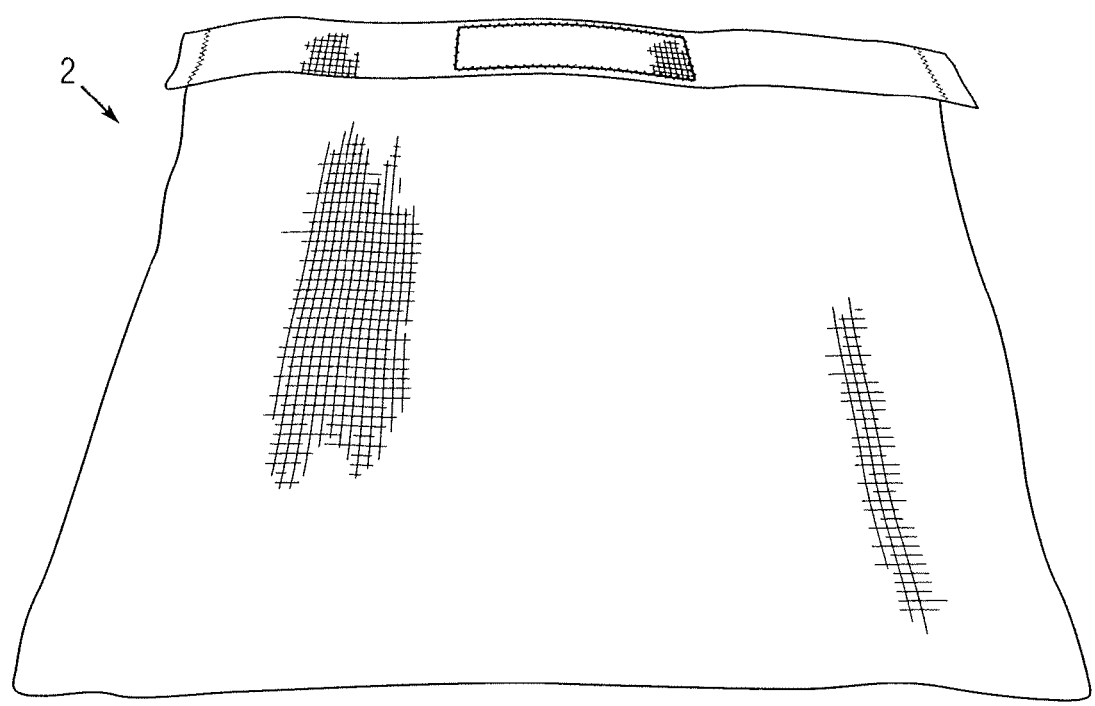
FIG. 5 is a perspective view of a sling folded into its self-storing pocket.

A fabric pocket 42 is preferably sewn to one of the corners of the lower surface of the lower layer 35b, or, alternately but as depicted, may be sewn to one of the lower corners of the upper surface of the upper layer 35a, although this may present some discomfort to a passenger. The fabric pocket 42 is preferably of like material and comprises a 7"×7" square with overhanging slit to allow the entire sling 2 to be folded onto itself and stowed inside when not in use. FIG. 5 is a perspective view of the sling folded into its self-storing pocket.

Even when no caregiver is present to assist, the steps for using the sling 2 may be followed in much the same manner excepting that the individual themselves may complete the final rotation and translation steps with the aid of the low friction surface. The step of buckling and/or cinching the lateral strap 24 may be completed by positioning the hardware element at the side of the vehicle seat where it can be accessed by the individual to be cinched tight.

The sling 2 may be adapted for use in the rear sear of a vehicle (wherein the lateral strap 24 cannot be buckled behind the seat back). In this case, the distal ends of the lateral strap 24 may be provided with a hook, clip or similar type hardware element for engaging the LATCH anchor system (Lower Anchors and Tethers for Children) required by the NHTSA to be installed on vehicles manufactured since 2003 (also referred to as ISOFIX in Europe and LUAS (Lower Universal Anchorage System) in Canada). The LATCH system provides a pair of metal "u-shaped" bars hidden within a vehicle seat at the seat bottom-seat back junction to which the lateral strap may be attached.

The sling 2 allows for easy repositioning of the person 10 and reduces the possibility of injury to passenger or to the caregiver 20. Where a caregiver is required, only a single caregiver 20 is needed to assist in the transfer and many individuals of diminished capacity who previously could not enter/exit a vehicle without the aid of a caregiver may regain the ability to do so as a result of the present invention. Further, the caregiver 20 need have no special skills or training to use the sling 2 which can be used to evacuate any person 10 with physical disabilities (regardless of age), an injured person, an elderly person, or any other person who requires assistance. When not in use, the entire sling 2 can be folded into a compact configuration and stowed in a small carry bag for transport within the glove compartment of the vehicle.

It should now be apparent that the above-described sling 2 is lightweight for in-car storage and can be used by unskilled operators, and yet greatly facilitates in rotation of a patient's legs and lower body forty-five to ninety degrees from center and then shifting their weight to a standing position, all by a low friction fabric-on-fabric interface. Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A sling for facilitating entry to and exit from an automobile seat by persons with diminished mobility, comprising:
a generally rectangular fabric element having an upper portion of at least a single-ply for positioning relative to a back of said automobile seat and a two-ply lower portion for positioning relative to a bottom of said automobile seat, said lower portion further comprising an upper layer and an opposing lower layer, at least one of said upper layer and lower layer including a low-friction coating for creating a low coefficient of friction between said upper layer and said lower layer within a range of from 0.1 to 0.25;
a split junction yoke formed in said upper portion for receiving a headrest of said automobile seat, said split junction yoke having opposing strips of hook-and-loop material for attachment around the headrest of said automobile seat;
a strap element joined to at least said upper layer of said lower portion of said fabric element, said strap element extending beyond a periphery of said lower portion and further comprising a hardware element for adjustably joining a first end of said strap element to a second end of said strap element to form a loop of reducible size;
said upper layer and said lower layer of said two-ply lower portion being joined only at said strap element but otherwise free for relative sliding of said upper layer on said opposing lower layer.

2. The sling of claim 1, wherein said fabric is comprised of a thermoplastic.

3. The sling of claim 2, wherein said fabric is comprised of rip-stop nylon.

4. The sling of claim 2, wherein said fabric is comprised of Polytetrafluoroethylene.

5. The sling of claim 1, wherein said fabric is a woven fabric.

6. The sling of claim 1, wherein said coating comprises silicone.

7. The sling of claim 1, wherein said upper portion further comprises an upper layer and a lower layer, the upper layer joined to the lower layer at a periphery of said upper portion.

8. The sling of claim 1, wherein said split junction yoke further comprises a rectangular cutout formed proximate a top edge of said upper portion; and an offset medial slit in said fabric element, said medial slit extending from said top edge of said upper portion to said rectangular cutout; and hook-and loop fasteners on both sides of said slit for securing said headrest in said yoke.

9. The sling of claim 8, further comprising a rectangular extension sewn on one side of said offset medial slit for overlying said fabric element on the opposing side of said offset medial slit, at least one of said hook-and loop fasteners being sewn to said rectangular extension.

10. The sling of claim 1, wherein said hardware element is a side release buckle.

11. A method for facilitating entry into an automobile seat by a person with diminished mobility, comprising the steps of:
providing a sling comprising a generally rectangular fabric element having an upper portion for positioning relative to a back of said automobile seat and a lower portion for positioning relative to a bottom of said automobile seat, said lower portion further comprising an upper layer and an opposing lower layer, at least one of said upper layer and lower layer including a low-friction coating for creating a low coefficient of friction between said upper layer and said lower layer within a range of from 0.1 to 0.25;
a yoke in said upper portion for receiving a headrest of said automobile seat;
a strap element joined to at least said upper layer of said lower portion of said fabric element, said strap element extending beyond a periphery of said lower portion and further comprising a hardware element for adjustably joining a first end of said strap element to a second end of said strap element to form a loop of reducible size, said upper layer and said lower layer of said two-ply lower portion being joined only at said strap element but otherwise free for relative sliding of said upper layer on said opposing lower layer;

positioning said sling on said automobile seat;

draping said upper layer over a side of said seat bottom, lower the buttocks of said person with diminished mobility onto said upper layer and positioning the feet of said person in said vehicle, entering said vehicle from an opposite side, gripping an edge of said upper layer and pulling said upper layer onto said seat bottom over said lower layer thereby sliding and rotating said individual onto said seat bottom, joining said first end of said strap element to said second end of said strap element thereby forming said loop around said seat back, cinching said loop around said seat back thereby pulling said upper layer toward said seat back.

\* \* \* \* \*